(12) United States Patent
Takao et al.

(10) Patent No.: US 11,858,794 B2
(45) Date of Patent: Jan. 2, 2024

(54) CONTROL DEVICE, MOVEMENT CONTROL SYSTEM, CONTROL METHOD, AND PROGRAM

(71) Applicant: MITSUBISHI HEAVY INDUSTRIES, LTD., Tokyo (JP)

(72) Inventors: Kenji Takao, Tokyo (JP); Yusuke Kinouchi, Tokyo (JP); Noriyuki Hasegawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 295 days.

(21) Appl. No.: 17/217,593

(22) Filed: Mar. 30, 2021

(65) Prior Publication Data

US 2021/0309501 A1    Oct. 7, 2021

(30) Foreign Application Priority Data

Apr. 6, 2020 (JP) ................................ 2020-068459

(51) Int. Cl.
*B66F 9/06* (2006.01)
*B66F 9/075* (2006.01)
*B66F 9/24* (2006.01)

(52) U.S. Cl.
CPC .......... *B66F 9/063* (2013.01); *B66F 9/07581* (2013.01); *B66F 9/24* (2013.01)

(58) Field of Classification Search
CPC ........ B66F 9/063; B66F 9/07581; B66F 9/24; B66F 9/0755; G05D 1/0225; G05D 2201/0216
See application file for complete search history.

(56) References Cited

U.S. PATENT DOCUMENTS

2004/0073359 A1    4/2004 Ichijo et al.
2018/0150972 A1    5/2018 Zhu
(Continued)

FOREIGN PATENT DOCUMENTS

JP    10-254542    9/1998
JP    2001-301987    10/2001
JP    2003-212489    7/2003

OTHER PUBLICATIONS

Extended European Search Report dated Jun. 14, 2021 in corresponding European Patent Application No. 21165503.0.
(Continued)

*Primary Examiner* — Tyler J Lee
*Assistant Examiner* — Yufeng Zhang
(74) *Attorney, Agent, or Firm* — Wenderoth, Lind & Ponack, L.L.P.

(57) ABSTRACT

A control device includes a route acquisition unit configured to acquire routes of a movable body for moving target objects to or from a target position at which the target objects are to be picked up or dropped, a reference position/posture acquisition unit configured to acquire information on a position at which the movable body picks up or drops a first target object of the target objects at the target position, and an information output unit configured to output information acquired by the route acquisition unit to the movable body. The route acquisition unit is configured to acquire the routes of the movable body for moving second and subsequent target objects of the target objects, based on the information acquired by the reference position/posture acquisition unit.

11 Claims, 18 Drawing Sheets

(56) References Cited

U.S. PATENT DOCUMENTS

2018/0194575 A1  7/2018  Anderson
2019/0119084 A1* 4/2019  Pautz .................... B66F 9/0755

OTHER PUBLICATIONS

Notice of Reasons for Refusal dated Oct. 31, 2023 in Japanese Patent Application No. 2020-068459 (with English machine translation).

* cited by examiner

CONTROL DEVICE, MOVEMENT CONTROL SYSTEM, CONTROL METHOD, AND PROGRAM

CROSS-REFERENCE TO RELATED APPLICATIONS

This application claims the benefit of priority to Japanese Patent Application Number 2020-068459 filed on Apr. 6, 2020. The entire contents of the above-identified application are hereby incorporated by reference.

TECHNICAL FIELD

The disclosure relates to a control device, a movement control system, a control method, and a program.

RELATED ART

In a movable body such as a forklift that transports a load, a technology has been known that detects the position of a load that is an object to be transported and automatically picks up and moves the load to a target position. In JP 2003-212489 A, a control device is described which detects a label attached to a load, identifies the position of the load, and controls the position of a movable body to pick up the load.

SUMMARY

Here, an object such as a load may be placed in a position deviated from a presumed installation position. Further, when an object is transported to a truck or the like, and the stop position of the truck deviates from a presumed position, the object cannot be transported to a presumed position in the truck. In the method described in JP 2003-212489 A, the correct position can be detected by detecting a marker of the object, but processing of detecting the marker is executed every time, so that there is a limit to the improvement of work efficiency.

The present disclosure is intended to solve the above-described problems, and an object of the present disclosure is to provide a control device, a movement control system, a control method, and a program capable of transporting an object efficiently with high accuracy.

To solve the problems described above and achieve an object, a control device according to the present disclosure is a computation device for outputting information to a movable body configured to move automatically, the control device including a route acquisition unit configured to acquire a route of the movable body for moving a plurality of aligned target objects to or from a target position at which the target objects are picked up or dropped; a reference position/posture acquisition unit configured to acquire information on a position at which the movable body picks up or drops a first target object of the plurality of target objects at the target position; and an information output unit configured to output the information acquired by the route acquisition unit to the movable body, in which the route acquisition unit acquires routes of the movable body for moving second and subsequent target objects of the plurality of target objects, based on the information acquired by the reference position/posture acquisition unit.

To solve the problems described above and achieve the object, a movement control system according to the present disclosure includes the computation device and the movable body.

To solve the problems described above and achieve an object, a control method according to the present disclosure is a control method of a movable body configured to transport a plurality of aligned target objects to or from a target position, the control method comprising: acquiring information on a position for picking up or dropping a first target object of the plurality of target objects at the target position; acquiring routes of the movable body for moving second and subsequent target objects of the plurality of target objects, based on the information on the position for picking up or dropping the first target object; and outputting the acquired routes of the movable body.

To solve the problems described above and achieve an object, a program according to the present disclosure is a program for causing a computer to execute a control method of a movable body configured to transport a plurality of aligned target objects to or from a target position, the program causing the computer to execute: acquiring information on a position for picking up or dropping a first target object of the plurality of target objects at the target position; acquiring routes of the movable body for moving second and subsequent target objects of the plurality of target objects, based on the information on the position for picking up or dropping the first target object; and outputting the acquired routes of the movable body.

According to the present disclosure, objects can be transported efficiently with high accuracy.

BRIEF DESCRIPTION OF DRAWINGS

The disclosure will be described with reference to the accompanying drawings, wherein like numbers reference like elements.

DESCRIPTION OF EMBODIMENTS

Preferred embodiments of the disclosure will be described in detail below with reference to the accompanying drawings. Note that the disclosure is not limited to these embodiments, and, when there are a plurality of embodiments, the disclosure is intended to include a configuration combining these embodiments.

Overall Configuration of Movement Control System

Figure 1:
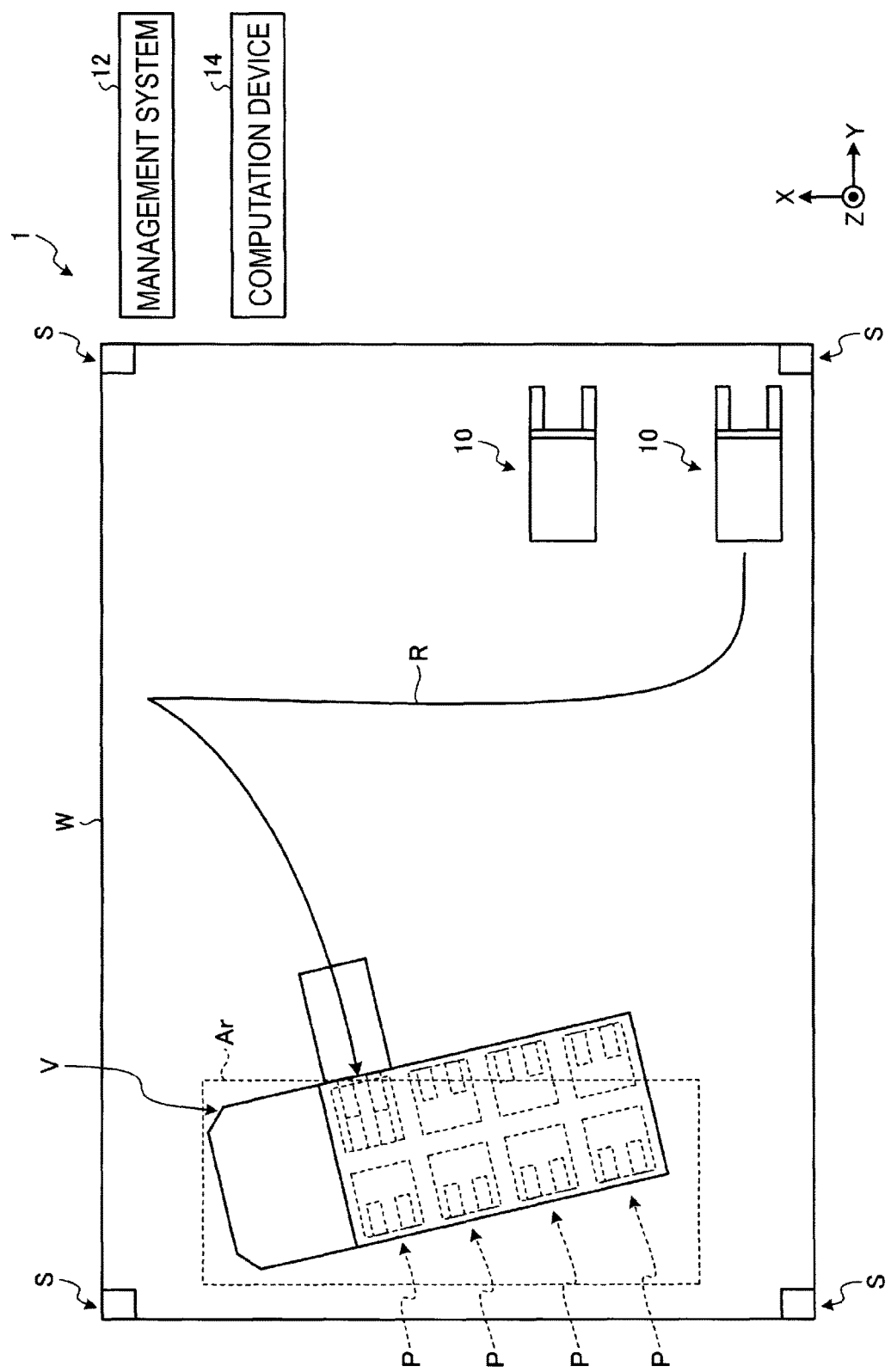
FIG. 1 is a schematic view of a movement control system according to the present embodiment.

FIG. 1 is a schematic view of a movement control system according to a first embodiment. As illustrated in FIG. 1, a movement control system 1 according to the first embodiment includes a movable body 10, a management system 12, and a computation device 14. The movement control system 1 is a system that controls movement of the movable body 10 that belongs to a facility W. The facility W is a facility that is logistically managed, such as a warehouse. In the facility W of the present embodiment, a truck V is stopped in an area Ar. The movement control system 1 picks up a pallet (load) P mounted on the truck (vehicle) V with the movable body 10, and drops the pallet P in a predetermined standby position. The movement control system 1 also picks up a pallet P disposed in a predetermined standby position with the movable body 10, and drops the pallet P in the truck V. In other words, the movement control system 1 performs unloading work or loading work of the pallet P from or on the truck V. The area Ar is an area which is set as a stop position of the truck V, and is divided by, for example, a white line or the like. An area where the movable body 10 moves is provided around the area Ar. The standby place can be provided at any place of the facility W. Further, although only one area Ar is illustrated in the facility W of the present embodiment, a plurality of the areas Ar may be disposed. Further, the number of the movable bodies 10 is not limited to two, and may be one or three or more.

Truck

Figure 2:
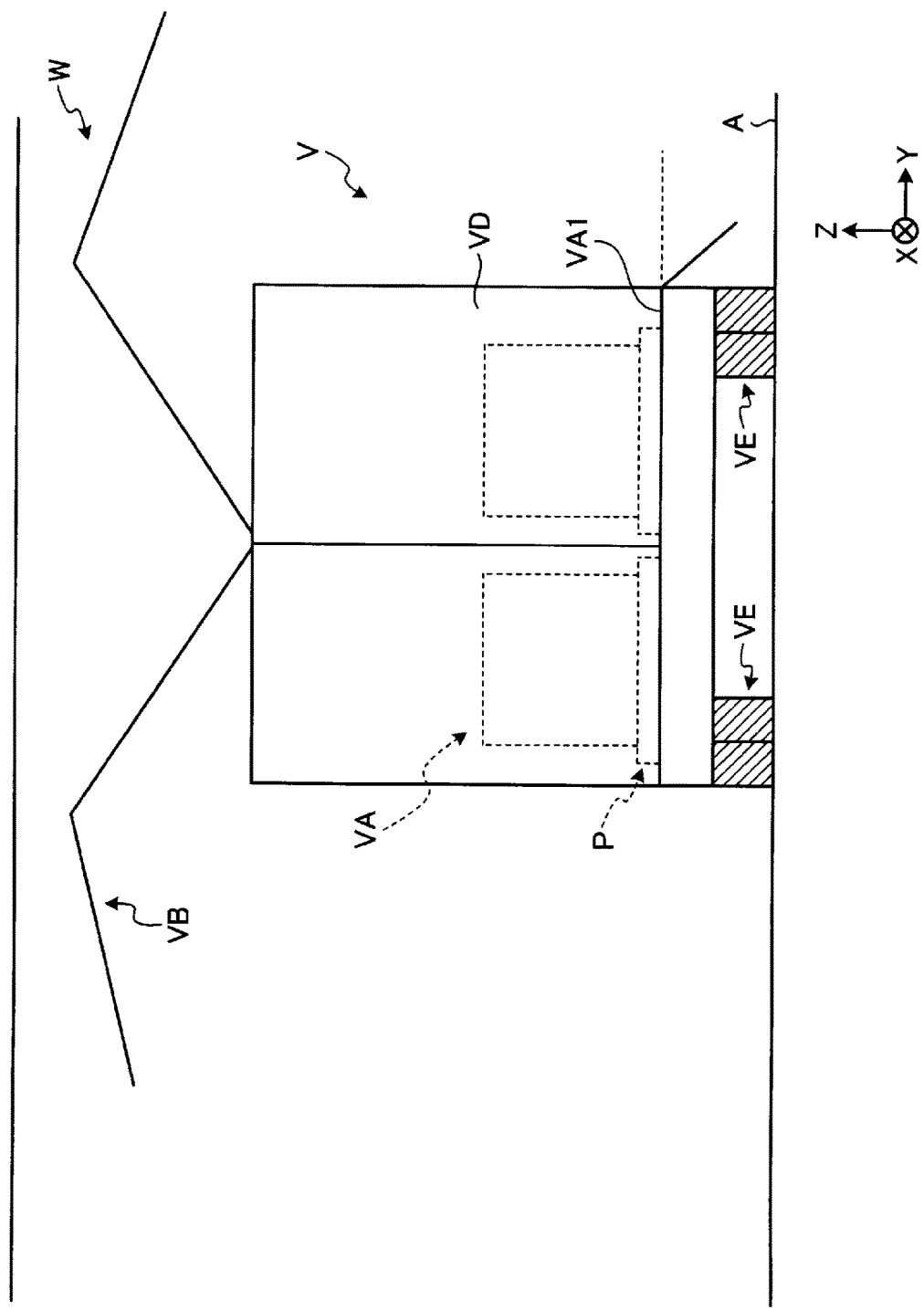
FIG. 2 is a schematic view illustrating a schematic configuration of a truck.

FIG. 2 is a schematic view illustrating a schematic configuration of the truck. The truck V of the present embodiment is a vehicle that travels by driving a plurality of tires VE. The truck V is a vehicle on which a plurality of pallets P can be mounted. In the truck V illustrated in FIG. 1, four pallets P are arranged in two rows. The pallets P are mounted in the storage chamber VA of the truck V, as illustrated in FIG. 2. The truck V includes a side door VB. The side door VB is a door provided on each side of the storage chamber VA. The side door VB of the truck V is opened to allow the storage chamber VA to communicate with the exterior, so that the pallets P can be carried out. The truck V of the present embodiment includes a position in the storage chamber VA where the pallets P are held. The plurality of pallets P are arranged side-by-side within the storage chamber VA of the truck V. In the truck V of the present embodiment, the pallets are arranged in two rows in the storage chamber VA. Note that there are various arrangement patterns such as a case where the pallets are placed without intervals therebetween on the front side of the truck, a case where the pallets are placed without intervals therebetween on the rear side, or a case where the pallets placed in the storage chamber VA at intervals. The truck V of the present embodiment includes the side doors VB on both sides, and the movable body 10 can access the pallets P from each of the two side. The truck V of the present embodiment has a structure in which each side door VB is a rigid body and opens and closes vertically, but the side door VB may also be a curtain type door formed of a deforming fabric or plastic which opens and closes by moving its one end horizontally.

Movable Body

The movable body 10 is an automatically movable device. In the present embodiment, the movable body 10 is a forklift, so called an Automated Guided Forklift (AGF) or Automated Guided Vehicle (AGV). The movable body 10 moves within the facility W. The movable body 10 moves to the vicinity of the truck V, for example, along a route R. The route R is information transmitted from the computation device 14. When the movable body 10 has reached the vicinity of the vehicle V, the movable body 10 moves based on the set route and picks up each pallet P, based on the position information on the pallet P. The route R will be described in detail below. Hereinafter, one horizontal direction is referred to as a direction X, and a direction orthogonal to the direction X in the horizontal direction is referred to as a direction Y. Further, the direction orthogonal to the horizontal direction, that is, the direction orthogonal to the directions X and Y, is referred to as a direction Z.

Figure 3:
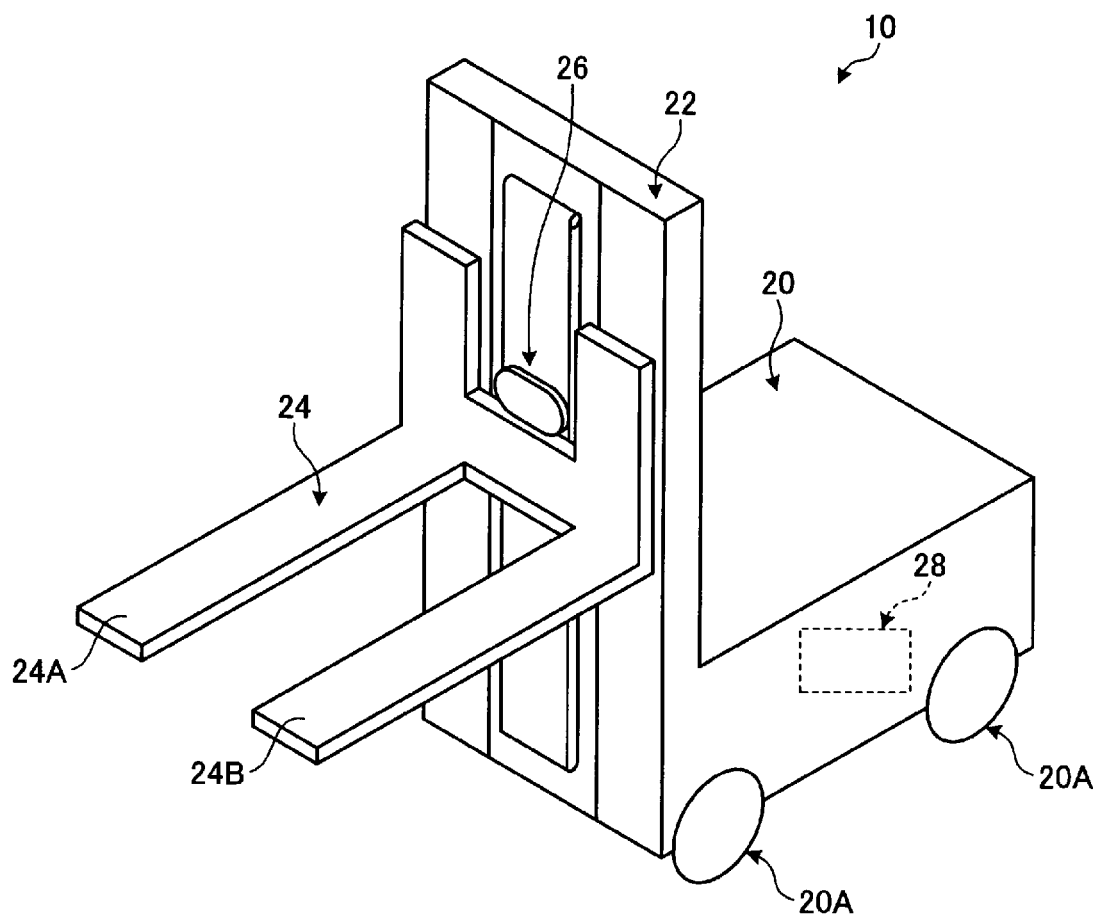
FIG. 3 is a schematic view of a configuration of a movable body.

FIG. 3 is a schematic view of a configuration of the movable body. As illustrated in FIG. 3, the movable body 10 includes a vehicle body 20, a mast 22, a fork 24, a sensor 26, and a control device 28. The vehicle body 20 includes a wheel 20A. The mast 22 is provided at one end portion in the front-back direction of the vehicle body 20. The mast 22 extends along a vertical direction (here, the direction Z) orthogonal to the front-back direction. The fork 24 is attached to the mast 22 in a manner movable in the direction Z. The fork 24 may be movable with respect to the mast 22 in the lateral direction of the vehicle body 20 (the direction intersecting the vertical direction and the front-back direction). The fork 24 includes a pair of tabs 24A, 24B. The tabs 24A, 24B extend from the mast 22 toward the front direction of the vehicle body 20. The tabs 24A, 24B are disposed away from each other in the lateral direction of the mast 22. In the front-back direction, the direction where the fork 24 is provided in the movable body 10 is referred to as a first direction, and the direction where the fork 24 is not provided is referred to as a second direction.

The sensor 26 detects at least one of the position and orientation of an object present around the vehicle body 20. The sensor 26 can also detect the position of the object relative to the movable body 10 and the orientation of the object relative to the movable body 10. In the present embodiment, the sensor 26 is provided in the mast 22, and detects the position and orientation of an object on the first direction side of the vehicle body 20. However, the detection direction of the sensor 26 is not limited to the first direction, and for example, the detection may be performed on both of the first direction side and the second direction side. In this case, as the sensor 26, a sensor for detection on the first direction side and a sensor for detection on the second direction side may be provided. The sensor 26 is a sensor that emits a laser beam, for example. The sensor 26 emits a laser beam while performing a scan in one direction (here, the lateral direction), and detects the position and orientation of an object based on reflected light of the emitted laser beam. The sensor 26 is not limited to the above, and may be a sensor for detecting a target object using any method. For example, the sensor 26 may be a camera or the like. Further, the position at which the sensor 26 is provided is not limited to the mast 22. Specifically, for example, a safety sensor provided on the movable body 10 may be also used as the sensor 26. The use of the safety sensor eliminates necessity of newly installing the sensor. As the sensor 26, a sensor provided with a mechanism that moves in the direction Z (vertical direction) with respect to the fork may also be provided. Thus, by moving the sensor in the direction Z, sensing can be performed without conjunction with the motion of the mast of the forklift.

The control device 28 controls the movement of the movable body 10. The control device 28 is a computer, and includes a control unit and a storage unit. The storage unit is a memory for storing various types of information such as the details of computations and programs of the control unit, and includes at least one of a RAM, a main storage device such as a ROM, and an external storage device such as a HDD. The control device 28 detects the position of the movable body 10, moves based on the information on the route R supplied from the computation device 14, and moves the pallet P. The control device 28 may also adjust the position of the fork 24 and the posture of the movable body 10, based on the detection results of the position and orientation of the pallet P from the sensor 26 of the movable body 10, and pick up and drop each pallet P. Further, the control device 28 outputs information detected by the sensor 26 to the computation device 14.

Management System

Figure 4:
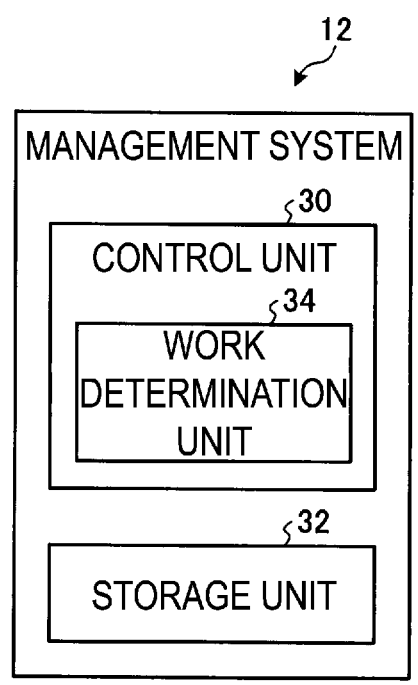
FIG. 4 is a schematic block diagram of a management system.

FIG. 4 is a schematic block diagram of the management system. The management system 12 is a system that manages the flow of goods in the facility W. The management system 12 is a Warehouse Management System (WMS) in the present embodiment. However, the management system 12 may be any system not limited to the WMS, and may be a back-end system such as other production management systems. The management system 12 is provided at any position. The management system 12 may be provided in the facility W, or may be provided at a position away from the facility W to manage the facility W therefrom. The management system 12 is a computer, and as illustrated in FIG. 3, includes a control unit 30 and a storage unit 32. The storage unit 32 is a memory for storing various types of information such as the details of computations and programs of the control unit 30, and includes at least one of a Random Access Memory (RAM), a main storage device such as a Read Only Memory (ROM), and an external storage device such as a Hard Disk Drive (HDD).

The control unit 30 is the computation device, that is, a Central Processing Unit (CPU). The control unit 30 includes a work determination unit 34. The control unit 30 implements the work determination unit 34 by reading and executing a program (software) from the storage unit 32, and executes the processing. Note that the control unit 30 may execute the processing by one CPU, or may include a plurality of CPUs and execute the processing by the plurality of CPUs. The work determination unit 34 may be achieved by a hardware circuit.

The work determination unit 34 determines each pallet P to be transported. Specifically, the work determination unit 34 determines the work details indicating the information on the pallet P to be transported, based on, for example, the input work plan. The work details are also considered to be information for identifying the pallet P to be transported. In the example of the present embodiment, the work determination unit 34 determines, as the work details, which pallet P (load) in which facility is to be transported, by when the pallet is to be transported and to where the pallet is to be transported. That is, the work details are information indicating the facility in which the target pallet P is stored, the target pallet P, the transport destination of the pallet P, and the time for transporting the pallet P. The work determination unit 34 transmits the determined work details to the computation device 14.

Computation Device

Figure 5:
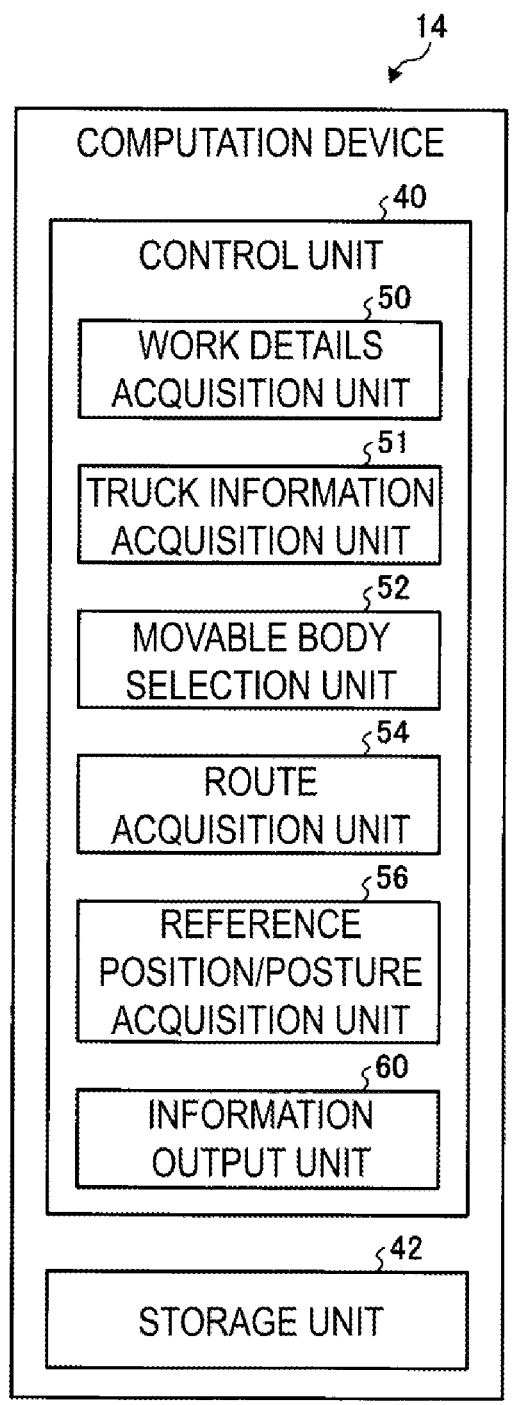
FIG. 5 is a schematic block diagram of a computation device.

FIG. 5 is a schematic block diagram of the computation device. The computation device 14 is a device that is provided in the facility W, computes information on the movement of the movable body 10, or the like, and outputs the information to the movable body 10. Further, the computation device 14 communicates with the truck V, and acquires information on the truck V that is stopped in the area Ar of the facility W. The information on the truck V includes information on whether to perform work in the facility W, and information on the type, position, or the like of each pallet P mounted on the truck V or each pallet P to be mounted on the truck V in the facility W. The computation device 14 is a computer, and as illustrated in FIG. 4, includes a control unit 40 and a storage unit 42. The storage unit 42 is a memory for storing various types of information such as the details of computations and programs of the control unit 40, and includes at least one of a RAM, a main storage device such as a ROM, and an external storage device such as a HDD.

The control unit 40 is a computation device, that is, a CPU. The control unit 40 includes a work details acquisition unit 50, a truck information acquisition unit 51, a movable body selection unit 52, a route acquisition unit 54, a reference position/posture acquisition unit 56, and an information output unit 60. The control unit 40 implements the work details acquisition unit 50, the movable body selection unit 52, the route acquisition unit 54, the information output unit 60, and the exclusive control unit 58, by reading and executing a program (software) from the storage unit 42, and executes the processing. Note that the control unit 40 may execute the processing by one CPU, or may include a plurality of CPUs and execute the processing by the plurality of CPUs. At least a part of the work details acquisition unit 50, the truck information acquisition unit 51, the movable body selection unit 52, the route acquisition unit 54, the reference position/posture acquisition unit 56, and the information output unit 60 may be achieved by a hardware circuit.

The work details acquisition unit 50 acquires information on the work details determined by the management system 12, that is, information on each pallet P to be transported. The work details acquisition unit 50 identifies the pallet P to be unloaded from the truck V, based on the information on the pallet P in the work details, and identifies the place where the pallet P is provided, and the place to which the pallet P is to be transported. For example, the storage unit 42 stores information on the pallet P, the truck V, and the standby place in association with each other, and the work details acquisition unit 50 reads the information from the storage unit 42 to identify the work details. The movable body selection unit 52 selects the target movable body 10. The truck information acquisition unit 51 communicates with the truck V to be stopped in the facility W, and acquires information from the truck V.

The movable body selection unit 52 selects a target movable body 10 from the plurality of movable bodies belonging to the facility W, for example. The movable body selection unit 52 may select the target movable body 10 by using any method, but may select, as the target movable body 10, for example, the movable body 10 suitable for transporting the pallet P, based on the place of the pallet P identified by the work details acquisition unit 50 or the type of the truck V.

The route acquisition unit 54 acquires information on the route R to the area Ar identified by the work details acquisition unit 50. The route acquisition unit 54 acquires information on the route R associated with each pallet P to be loaded or unloaded on or from the truck V. The route acquisition unit 54 also acquires information obtained by recalculating the route R, based on information from the reference position/posture acquisition unit 56. The route acquisition unit 54 may acquire the route information from the management system 12 or may execute computing processing to acquire the route information. The first route R is preset, for example, for each area Ar, and, for example, the route acquisition unit 54 acquires, from the storage unit 42, position (coordinate) information on the route R set for the area Ar identified by the work details acquisition unit 50. The initial route R is set, for example, based on the position of the pallet P when the truck V is stopped in the set position in the area Ar. The route R is a path from the preset start position to the area Ar in the present embodiment. Here, the start position may be a position in which the movable body 10 is on standby. The route R is set in advance, based on map information on the facility W. The map information on the facility W is information including position information on an obstacle (such as a post) installed in the facility W or a passage through which the movable body 10 is capable of traveling. It can be said that the map information is information indicating an area in which the movable body 10 is movable in the area Ar. In addition to the map information on the facility W, the route R may be set based on vehicle specification information of the movable body 10. The vehicle specification information is, for example, a specification which affects the movable path of the movable body 10, such as the size and the minimum turn radius of the movable body 10. In a case where the route R is set based on the vehicle specification information, the route R may be set for each movable body. Note that the route R may be manually set, based on the map information, the vehicle specification information, or the like, or may be automatically set by a device such as the computation device 14, based on the map information, the vehicle specification information, or the like. When the route R is automatically set, for example, a desired pass point (Way point) may be designated. In this case, a shortest route R which avoids obstacles (such as a fixed object such as a wall) can be set while passing through the desired pass point.

The reference position/posture acquisition unit 56 acquires information for identifying the position in the truck V of the first pallet P to be transported from or to the truck V, that is, the pallet P to be first unloaded from the truck V or the pallet P to be first loaded on the truck V. The reference position/posture acquisition unit 56 acquires, from the movable body 10, position information on the first pallet P to be transported to the truck V. The position information on the pallet P in the truck V includes at least the position of the pallet P, and the horizontal orientation of the pallet P within the facility W. The position information on the pallet P in the truck V may include the height information on the pallet P.

The information output unit 60 outputs the information acquired by the computation device 14 to the movable body 10 via a communication unit. The communication method between the movable body 10 and the computation device 14 is wireless communication in the present embodiment, but any communication method may be used. The information output unit 60 outputs the information on the route R acquired by the route acquisition unit 54 to the movable body 10. Because the route R is a path toward the truck V, it can be considered to be information regarding the movement of the movable body 10.

Next, a processing operation by the movement control system 1 will be described using FIGS. 6 to 12. When transporting the pallets P to the truck V, the movement control system 1 acquires information on the first pallet P to be transported to the truck V, with the support of a worker. Then, the movement control system 1 sets the transport routes R for the second and subsequent pallets P, based on the acquired information on the first pallet P, and transports the pallets P by the movable body 10. Hereinafter, the processing performed by the movement control system 1 will be described by describing processing by the truck, processing by the computation device, and processing by the movable body. Further, in the following, a case of unloading work will be described in which the movable body 10 carries out the pallets P in the truck V from the truck V after the truck V arrives at the facility W in a state where the pallets P are mounted on the truck V.

Figure 6:
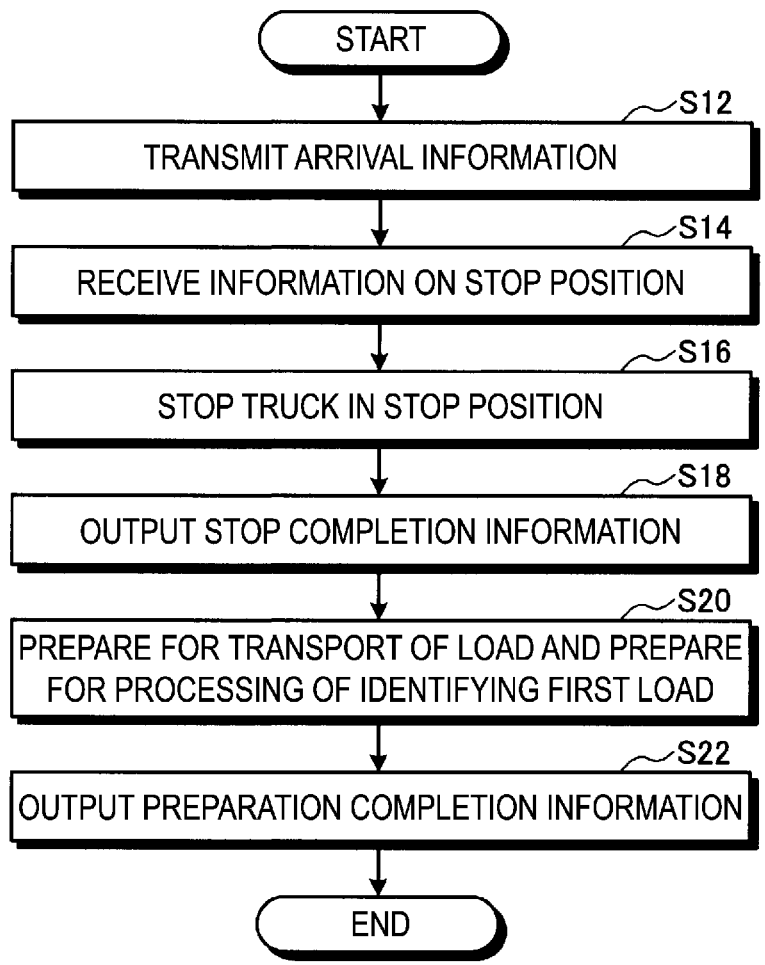
FIG. 6 is a flowchart illustrating an example of processing performed by the truck.

FIG. 6 is a flowchart illustrating an example of processing performed by the truck. The processing illustrated in FIG. 6 is performed by a worker of the truck using various devices. First, the truck V outputs arrival information to the computation device 14 (step S12). Specifically, the truck V outputs information on a time to arrive at the facility W, and current position information. Note that when a schedule for arriving at the facility W, or the like is predetermined, the processing of step S12 may not be executed.

The truck V receives information on a stop position (step S14). The truck V acquires, from the computation device 14, information on which position of the facility W the truck V is to stop. The truck V is stopped in the stop position (step S16). The worker stops the truck V in the designated area Ar. The truck V is stopped in the area Ar, and then outputs a position where the vehicle has been completely stopped to the computation device 14 (step S18).

Next, the truck V prepares for transport of a pallet (load) and prepares for processing of identifying the first load (step S20). Specifically, in preparation for the transport of the pallet (load), the worker opens the side door VB to allow the pallets P to be carried out. Further, in preparation for the processing of identifying the first load, the worker makes it possible to notify the sensor 26 of the movable body 10 of the position of the pallet P to be carried out first.

Figure 7:
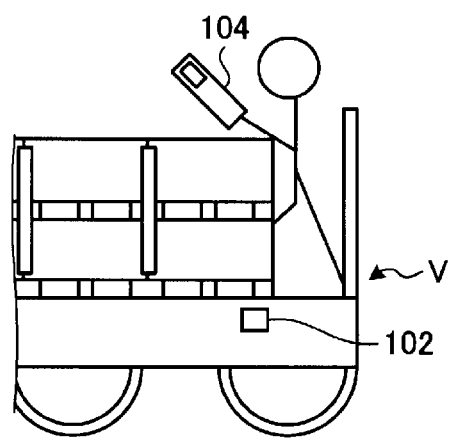
FIG. 7 is a schematic view illustrating an example of a position identifying device.

FIG. 7 is a schematic view illustrating an example of a position identifying device. The worker of the present embodiment disposes a position identifying device 102 in the vicinity of the loading platform on which the pallets P are installed. The position identifying device 102 is a mark detectable by the sensor 26. Specifically, the position identifying device 102 is a mark formed of a material that reflects measurement light from the sensor 26. The position identifying device 102 is formed in a two-dimensional pattern. By the sensor 26 detecting the position identifying device 102 of a two-dimensional pattern, the position and posture (orientation) of the pallet P associated with the position identifying device 102 can be detected. A unit that makes it possible to notify the sensor 26 of the movable body 10 of the position of the pallet P to be carried out first is not limited to the position identifying device 102. As illustrated in FIG. 7, a position identifying device 104 that can be gripped by a worker may be used. The position identifying device 104 is a portable mark that can be detected by the sensor 26. The worker carries the position identifying device 104 and teaches the sensor 26 of the movable body 10 in the vicinity of the pallet P, which allows the position of the pallet P to be provided to the movable body 10. Recognition processing in the movable body 10 will be described later. After the preparation is completed, the truck V outputs preparation completion information to the computation device 14 (step S22).

Figure 8:
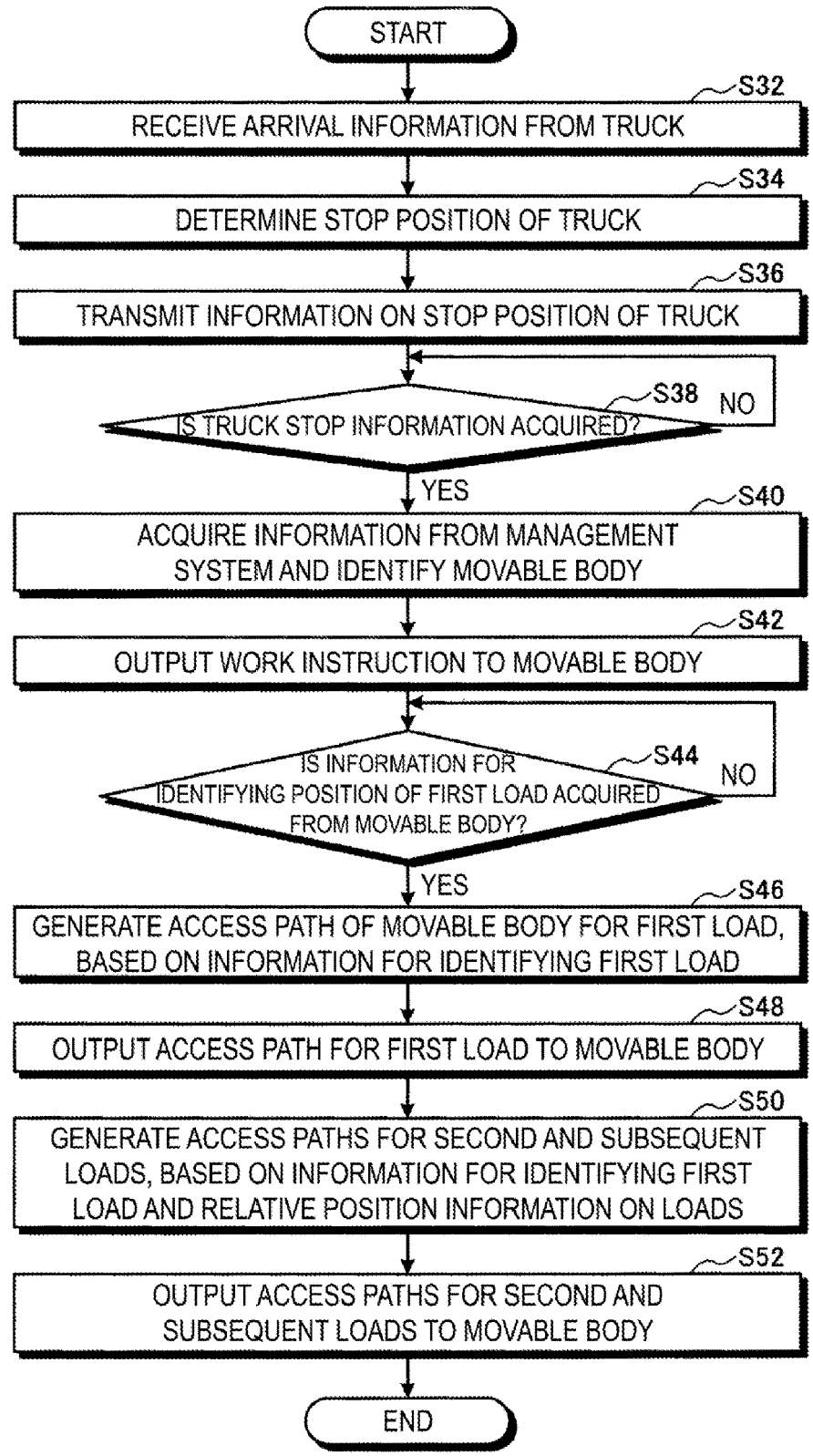
FIG. 8 is a flowchart illustrating an example of processing performed by the computation device.

Next, the processing performed by the computation device 14 will be described. FIG. 8 is a flowchart illustrating an example of the processing performed by the computation device. The computation device 14 acquires arrival information from the truck (step S32). The computation device 14 determines a truck stop position (step S34), and outputs information on the truck stop position to the truck (step S36). The computation device 14 determines whether the truck stop information has been acquired (step S38). The computation device 14 determines whether information indicating that the truck to which the stop position information has been provided has stopped in the designated position has been received. When the computation device 14 determines that the truck stop information has not been acquired (No in step S38), the processing returns to step S38. In other words, the computation device 14 repeats the processing in step S38 until the truck stop information is acquired.

When the computation device 14 determines that the truck stop information has been acquired (Yes in step S38), the computation device 14 acquires information from the management system and identifies a movable body (step S40). That is, a movable body carrying out the pallet P from the truck V is identified. The computation device 14 outputs a work instruction to the identified movable body (step S42). The work instruction includes information on a route for moving the movable body 10 that carries out the first pallet to the vicinity of the first pallet P in the area Ar, and an instruction to execute processing of detecting the position of the first pallet P.

Next, the computation device 14 determines whether the information for identifying the position of the first load (pallet) has been acquired from the movable body (step S44). When the computation device 14 determines that the information for identifying the position of the first load (pallet) has not been acquired (No in step S44), the processing returns to step S44. In other words, the computation device 14 repeats the processing in step S44 until information for identifying the position of the first load (pallet) is acquired.

When the computation device 14 determines that the information for identifying the position of the first load (pallet) has been acquired (Yes in step S44), the computation device 14 generates an access path of the movable body for the first load, based on the information for identifying the first load (pallet)(step S46). That is, the computation device 14 generates a route along which the movable body 10 moves from the current position to the first pallet, based on the position information on the first pallet acquired by the movable body 10. Upon setting the access path, the computation device 14 outputs the access path to the first load (pallet) to the movable body (step S48).

Next, the computation device 14 generates the access paths for the second and subsequent loads, based on the information for identifying the first load (pallet) and the relative position information on the loads (pallets) (step S50). That is, the position of each pallet mounted on the truck V is calculated, based on the position information on the first pallet and the relative position information on each pallet mounted on the truck V, and the route along which the movable body 10 makes access is generated, based on the position of each pallet. The relative position information on each pallet can be acquired based on the information on the loading platform of the truck, the position of each pallet mounted, and the like, included in the information transmitted from the truck. Specifically, the computation device 14 acquires the position and posture of the first pallet. Further, the computation device 14 estimates the placement position of each pallet in the truck, for example, based on the number of the pallets mounted on the truck V obtained from the relative position information on the pallets and based on the information on the placement interval (for example, information on the thickness of a buffer material disposed between the pallets). The computation device 14 generates access paths for the second and subsequent pallets, based on the estimated position information and posture information of the second and subsequent pallets.

Note that the computation device 14 may also acquire position information on the second and subsequent pallets, perform the same processing as in steps S46 to S50, based on the acquired position information on the plurality of pallets, and regenerate (modify) access paths for the acquired transport target pallet and pallets subsequent thereto.

Upon generating the access paths, the computation device 14 outputs the access paths for the second and subsequent loads (pallets) to the movable body (step S52). When the plurality of pallets P mounted on the one truck V are transported by the plurality of movable bodies 10, the computation device 14 outputs respective access paths to the movable bodies 10.

Figure 9:
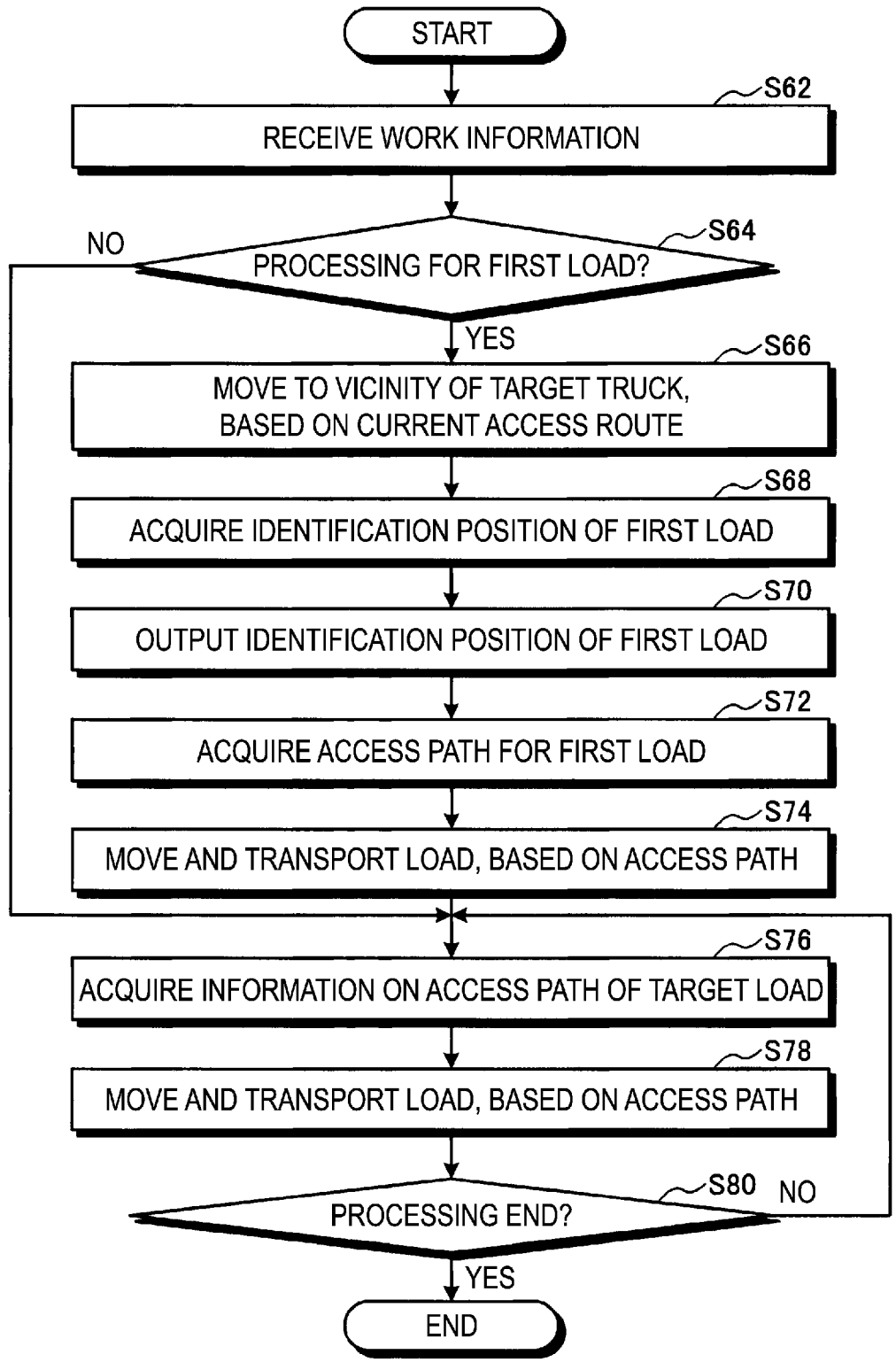
FIG. 9 is a flowchart illustrating an example of processing performed by the movable body.

Next, an operation of the movable body 10 will be described. FIG. 9 is a flowchart illustrating an example of processing performed by the movable body. The movable body 10 acquires work information transmitted from the computation device 14 (step S62). When acquiring the work information, the movable body 10 determines whether the information is for processing for the first load (pallet) (step S64). The movable body 10 may execute the processing in steps S64 to S80 by executing the processing included in the work information without executing the determination processing. In other words, the movable body 10 may perform the processing based on the work information and perform each of the processing operations in FIG. 9.

When the movable body 10 determines that the information is not for the processing for the first load (pallet) (No in step S64), the processing proceeds to step S76. When determining that the information is for the processing for the first load (pallet) (Yes in step S64), the movable body 10 moves to the vicinity of the target truck, based on the current access route (step S66).

Next, the movable body 10 acquires information on an identification position, which is information for identifying the position of the first load (step S68). Specifically, as described above, the sensor 26 detects the position identifying device disposed by the worker in the vicinity of the first pallet. The position of the position identifying device detected by the sensor 26 is set as an identification position for identifying the first pallet.

After detecting the identification position of the pallet, the movable body 10 outputs the identification position of the first load (pallet) to the computation device 14 (step S70). After outputting the identification position, the movable body 10 acquires the access path for the first load (pallet) (step S72). In other words, the route of movement from the current position to the pallet P, calculated based on the identification position by the computation device 14, is acquired. The movable body 10 moves based on the access path, and transports the load (pallet) (step S74).

After executing the processing in step S74 or when making a determination of No in step S64, the movable body 10 acquires information on the access path for the target load (step S76). That is, the movable body 10 acquires information on the access paths for transporting the second and subsequent pallets and the route for moving to the target pallet. The movable body 10 moves based on the acquired access path, and transports each load (pallet) (step S78).

Here, when approaching each of the second and subsequent pallets, the movable body 10 measures the position of the pallet during the approach, and acquires deviation information between the estimated pallet position and the measured pallet position. The pallets mounted on the truck may positionally deviated due to deviation when the pallets are mounted or variation in the thicknesses of buffer materials. Based on the calculation result of the positional deviation, the movable body 10 allows the fork to perform side-shift (move the position of the fork in the horizontal direction) and hold the pallet. In addition, the movable body 10 outputs information on the positional deviation of the pallet and the amount of side-shift to the computation device 14. Further, in addition to the method of correcting the positional deviation by side-shift, the movable body 10 may use a method for updating and correcting an approach path, based on the positional deviation, or a method of correcting the positional deviation by using a servomechanism. The computation device 14 may regenerate or slightly modify the access routes, based on the acquired information on the transport of the second and subsequent pallets. Consequently, the influence due to the size variation of the buffer materials, the size variation of the pallets, and the load overhang on the pallet can be flexibly dealt with.

The movable body 10 determines whether the processing has ended, that is, whether the transport of the pallets has ended (step S80). When the movable body 10 determines that the processing has not ended (No in step S80), the processing returns to step S76 and the processing of transporting another pallet P is performed. When the movable body 10 determines that the processing has ended (Yes in step S80), the present processing ends.

Figure 10:
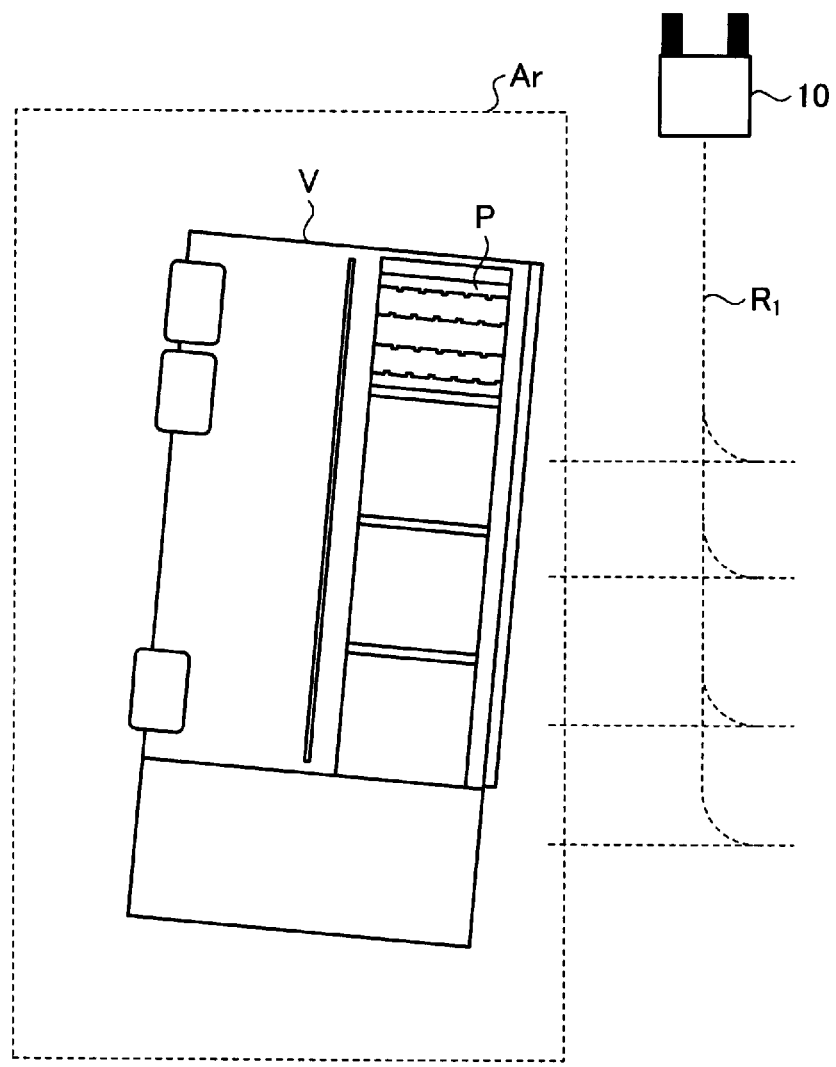
FIG. 10 is an explanatory diagram for describing processing performed by the movement control system.
Figure 11:
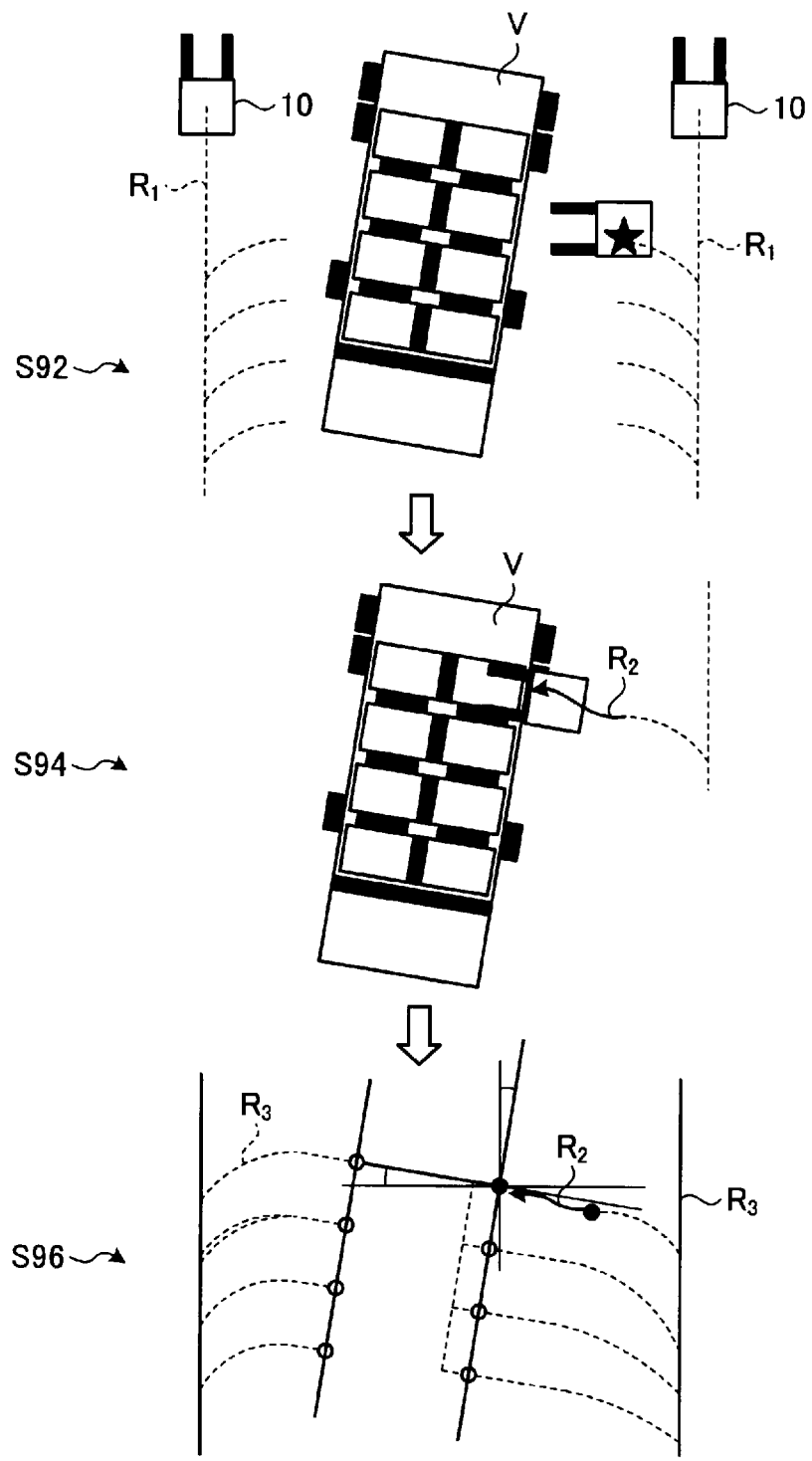
FIG. 11 is an explanatory diagram for describing processing performed by the movement control system.
Figure 12:
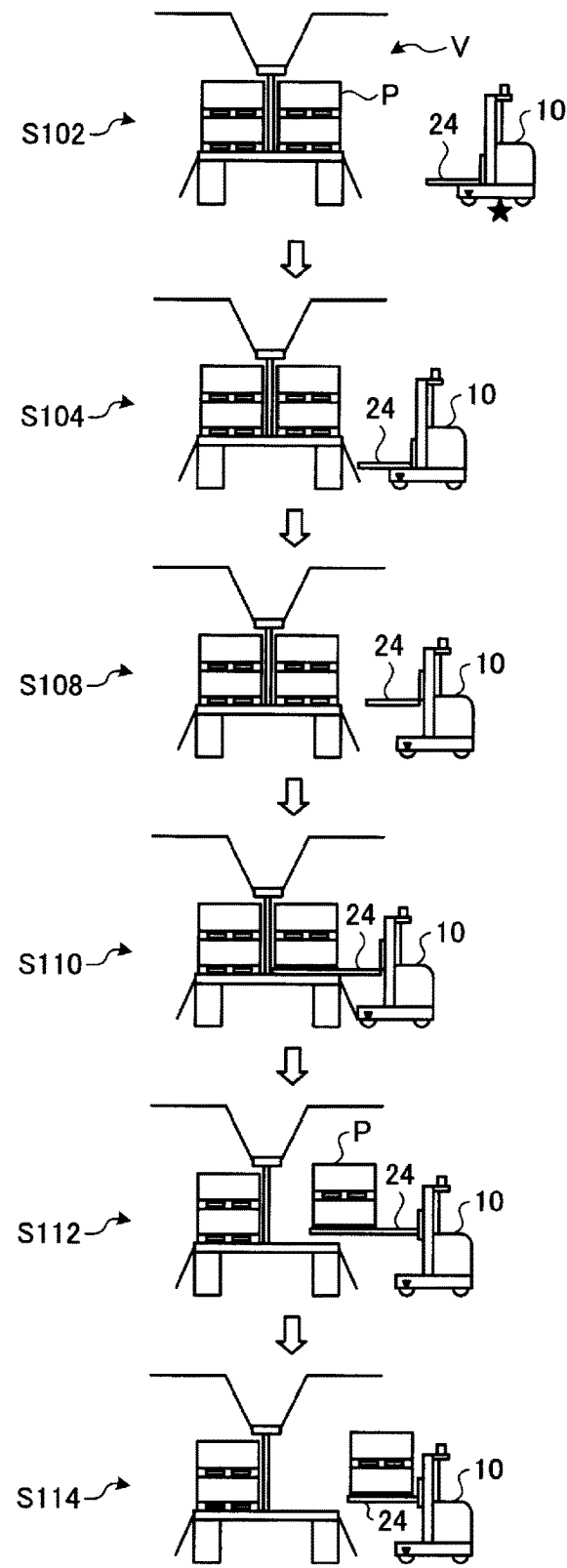
FIG. 12 is an explanatory diagram for describing processing performed by the movement control system.

FIG. 10 is an explanatory diagram for describing processing performed by the movement control system. FIG. 11 is an explanatory diagram for describing processing performed by the movement control system. FIG. 12 is an explanatory diagram for describing processing performed by the movement control system. The movement control system 1 performs the processing in FIGS. 6, 8, and 9 in conjunction with the truck V, the computation device 14, and the movable body 10, thereby transporting pallets (loads) which are target objects.

The movement control system 1 sets a standard access route R1 for the movable body 10 to the area Ar in which the truck V is stopped. The access route R1 is a route set in assumption that the truck V is stopped in the standard position in the area Ar. Here, because the truck V is driven and stopped by the worker, as illustrated in FIG. 10, the truck V may not stop in the center of the area Ar, and may deviate from the presumed position. When the movable body 10 moves along the route R1 in this deviated state, it takes a long time to find the first pallet P. It is also possible to mistakenly recognize another pallet. Further, the calculation load also increases when the plurality of pallets P are detected each time.

In the movement control system 1 of the present embodiment, as illustrated in step S92 of FIG. 11, the movable body 10 is moved to the vicinity of the truck V, based on the route R1 when the first pallet P is picked up. Thereafter, the movable body 10 detects the position identifying devices 102, 104 that the worker has arranged such that they are capable of being recognized by the movable body 10, thereby detecting the position of the first pallet.

The movement control system 1 calculates a route R2 to the position of the first pallet, based on the detected results, and moves the movable body 10 as illustrated in step S94. This allows the movable body 10 to move to a position where it is easy to pick up the first pallet.

The processing of picking up each pallet with the movable body 10 will be described below using FIG. 12. When picking up each pallet P, the movable body 10 moves from a position away from the pallet P as illustrated in step S102 to the vicinity of the pallet P as illustrated in step S104. Next, the movable body 10 moves the fork 24 in the vertical direction to the hold position of the pallet P, as illustrated in step S108.

The movable body 10 extends the fork 24 in the horizontal direction and inserts the tip of the fork 24 into the insertion position of the pallet P, as illustrated in step S110. The movable body 10 moves the fork 24 vertically upward with the fork 24 inserted into the pallet P and retracts the fork 24 to hold the pallet P with the fork 24, as illustrated in step S112. The movable body 10 then retracts the fork 24 to hold the pallet P at the base portion of the fork 24, as illustrated in step S114. Although the present embodiment has been described as a case in which the fork 24 is extended and retracted horizontally, the movable body 10 itself may move in the front-back direction without extending and retracting the fork 24 to bring the positional relationship between the fork 24 and the pallet to the above state.

The movement control system 1 calculates access routes R3 to other pallets, based on the position information on the first pallet P and the information on the relative position of the other pallets in the truck V, which are detected during transport of the first pallet P. Thus, as illustrated in step S96 in FIG. 11, the access routes R3 whose positions are adjusted according to the posture of the truck V is calculated. The movement control system 1 moves the movable body 10, based on the calculated access routes R3.

Effects of Present Embodiment

As described above, the movement control system 1 according to the present embodiment can move the movable body 10 with high accuracy to the pallets mounted on the truck, which is the target area, by calculating the access routes for the second and subsequent pallets, based on the position information on the first pallet. Further, during transport of the first pallet, the position information on the first pallet is detected based on the assistance of the worker, and the second and subsequent pallets can be automatically transported. Thus, the burden on the worker can be reduced and the accuracy of access to the pallets can be increased. According to the movement control system 1, it is also possible to improve throughput by increasing the speed of access to the pallets.

Because the movement control system 1 can identify the position by detecting the position identifying devices 102, 104 by the sensor 26, it is possible to reduce an increase in a work burden on the worker. Further, it is preferable that in the movement control system 1, the movable body 10 be provided with a mechanism for sliding the fork 24 and a mechanism for tilting the fork 24 so that the position of the fork 24 holding the pallet P is finely adjusted. This can increase the allowable deviation amount of the information for identifying the position information on the first pallet using the position identifying devices 102, 104, and thus increase the workability. The movement control system 1 can finely adjust the position of the fork 24 holding each pallet P, even when the positions of the second and subsequent pallets are deviated. Thus, it is possible to absorb the positional deviation due to the size variation of the pallets, the size variation of the buffer materials, and the overhang of the load on the pallet, and further increase the flexibility and improve the operating ratio.

Further, in the above embodiment, each pallet, which is the target object, is picked up from the truck, which is the target area, but the present disclosure can also be used in cases where each pallet, which is the target object, is dropped into the truck, which is the target area. In this case, when the movable body 10 drops the target objects, the position of each pallet Pin the target area is detected, the positions where the second and subsequent pallets are dropped are determined by using the result, and the access route is calculated. Note that when the pallet is dropped, the movement control system 1 detects the environment on both sides of the pallet drop position. For example, in the case of the first pallet, the positions of columns or walls of the loading platform of the truck is grasped. In the case of the second and subsequent pallets, the movement control system 1 estimates the position of an adjacent pallet load and the position of a buffer material and sets an access route. In the case of the last pallet, the movement control system 1 sets an access route on the basis of the load of the adjacent pallet and the information on the columns or walls of the loading platform. It is also preferable that the movable body move based on the information on the access route, and that the movable body drop the load while performing fine modification by the side shifting mechanism when finally dropping the load.

Figure 13:
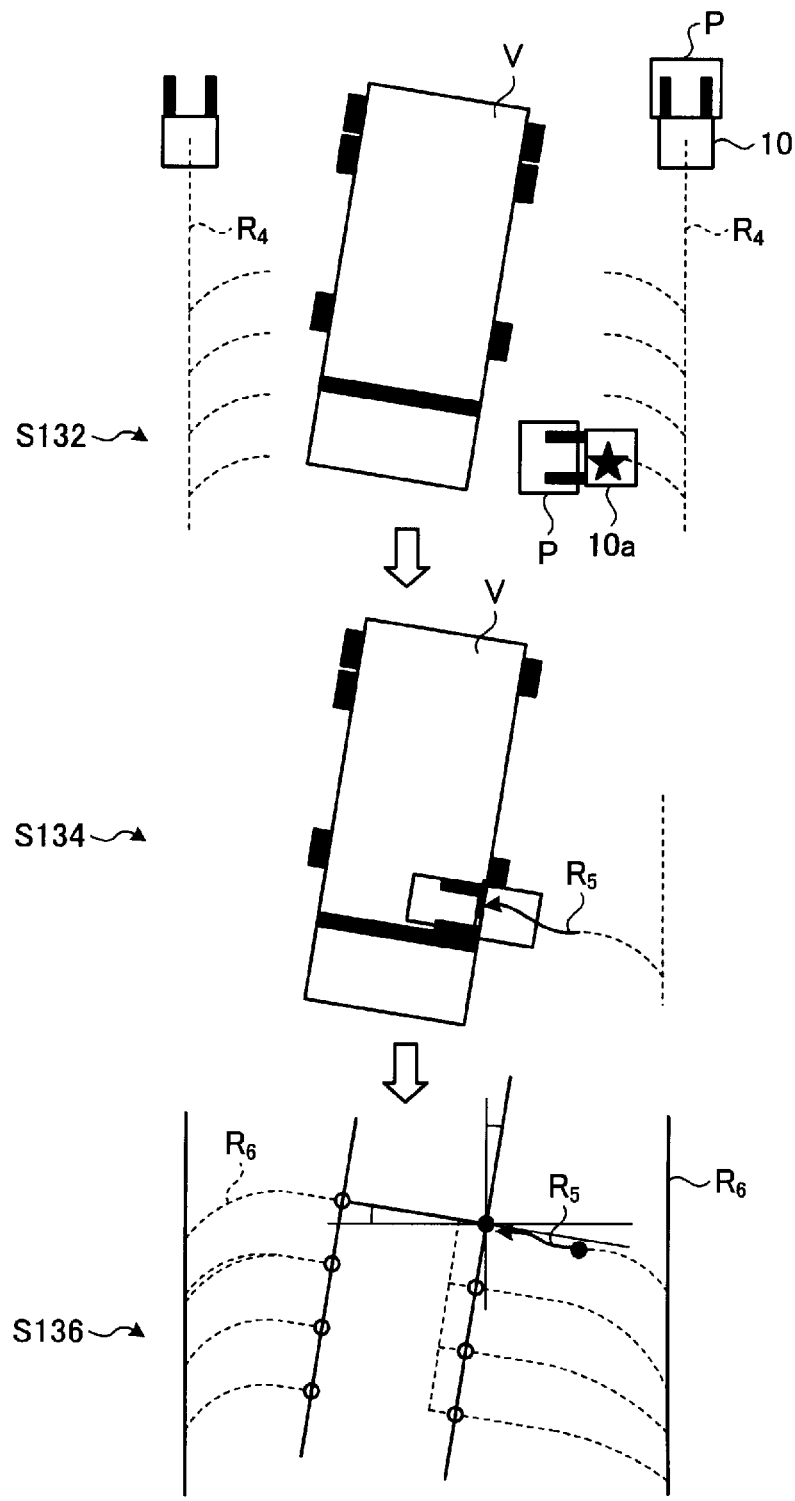
FIG. 13 is an explanatory diagram for describing processing for dropping a target object in the movement control system.
Figure 14:
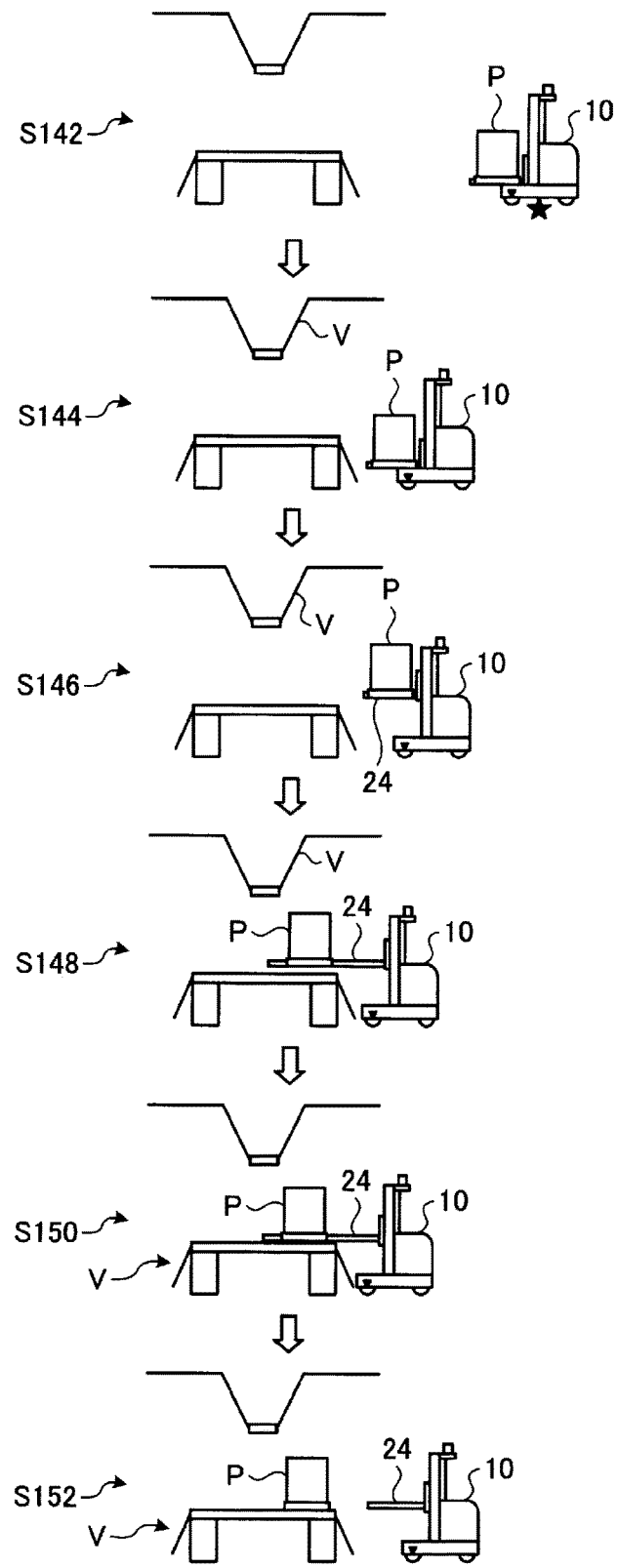
FIG. 14 is an explanatory diagram for describing processing for dropping a target object in the movement control system.

FIG. 13 is an explanatory diagram for describing processing for dropping a target object in the movement control system. FIG. 14 is an explanatory diagram for describing processing for dropping a target object in the movement control system.

In this case, as illustrated in step S132 of FIG. 13, the movement control system 1 moves the movable body 10 holding the pallet P to be dropped, to the vicinity of the truck V to which the first pallet P is to be dropped, based on a route R4. Here, the route R4 is the route when the truck V is stopped in an ideal position in the area. Thereafter, the movable body 10 detects the position identifying devices 102, 104 that the worker has arranged such that they are capable of being recognized by the movable body 10, thereby detecting the position where the first pallet is to be dropped.

The movement control system 1 calculates a route R5 to the position where the first pallet is to be dropped, based on the detected results, and moves the movable body 10 as illustrated in step S134. This allows the movable body 10 to move to a position where it is easy to drop the first pallet.

The processing of dropping each pallet with the movable body 10 will be described below using FIG. 14. When dropping each pallet P, the movable body 10 moves from a position away from a drop position as illustrated in step S142 to the vicinity of a position in the truck V where the pallet P is to be dropped as illustrated in step S144. Next, the movable body 10 moves the fork 24 in the vertical direction to the hold position of the pallet P, as illustrated in step S146.

The movable body 10 extends the fork 24 in the horizontal direction, and moves the pallet P to immediately above the position in the truck V where the pallet P is to be dropped, as illustrated in step S148. The movable body 10 moves the fork 24 vertically downward with the fork 24 inserted into the pallet P to bring the pallet P into contact with the truck V, as illustrated in step S150. Thereafter, the fork 24 is retracted to leave the movable body 10 away from the pallet P, as illustrated in step S152.

The movement control system 1 calculates access routes R6 to other pallets, based on the position information on the first pallet P and the information on the relative position of the other pallets in the truck V, which are detected during transport of the first pallet P. Thus, as illustrated in step S136 in FIG. 13, the access routes R6 whose positions are adjusted according to the posture of the truck V is calculated. The movement control system 1 moves the movable body 10 based on the calculated access routes R6 to drop the pallets P at respective positions of the truck V.

In this manner, even when dropping the target objects at the predetermined positions, the movement control system 1 can identify the drop position of the first pallet while obtaining the support of the worker, determine the drop positions of the second and subsequent pallets by using the result, and transport the pallets in an automatic operation, thereby transporting the target objects efficiently with high accuracy.

Figure 15:
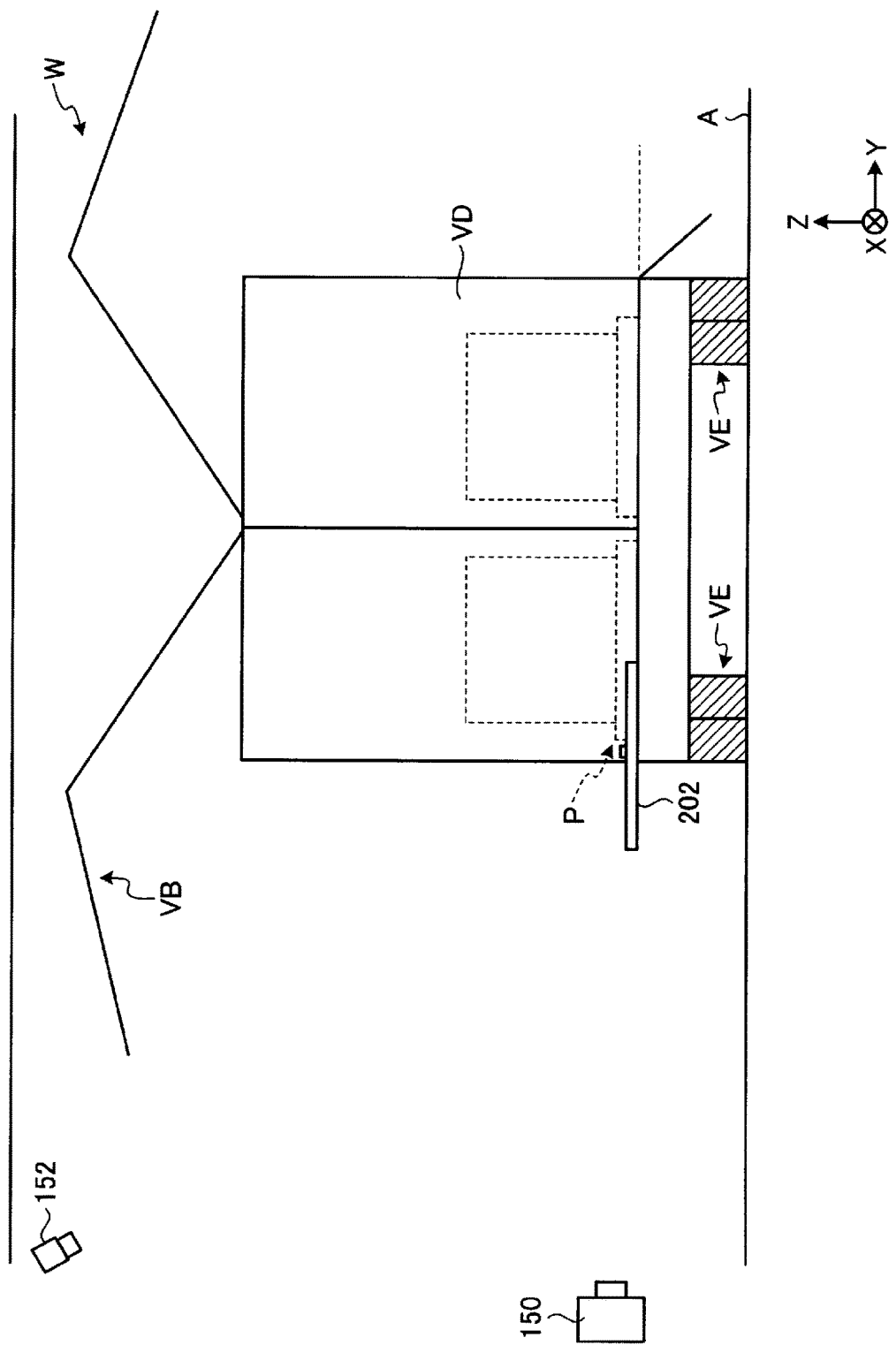
FIG. 15 is a schematic view illustrating a movement control system according to another embodiment.
Figure 16:
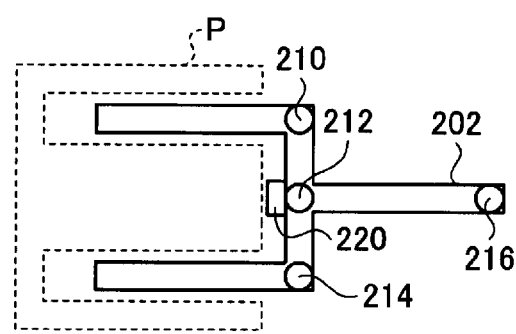
FIG. 16 is a schematic view illustrating an example of a position identifying device.

In the above embodiment, the position of the first pallet is detected by the sensor of the movable body 10, but the present disclosure is not limited thereto. FIG. 15 is a schematic view illustrating an overview of a movement control system according to another embodiment. FIG. 16 is a schematic view illustrating an example of a position identifying device. The movement control system illustrated in FIG. 15 includes cameras 150, 152. The movement control system detects the position of a position identifying device 202 with the cameras 150, 152. Here, as illustrated in FIG. 16, the position identifying device 202 includes a tip portion corresponding to the tip of the fork 24, and a gripping portion held by the worker. The position identifying device 202 includes marks 210, 212, 214, and 216 on the externally exposed portion with the tip portion inserted into the pallet P. When the position identifying device 202 is inserted into the pallet P to the correct position, a switch 220 is disposed in a position that contacts the pallet P.

When information for identifying the position of the first pallet P is acquired, the worker inserts the position identifying device 202 into the first pallet P and brings the switch 220 and pallet P into contact. When the movement control system 1 acquires information that the switch 220 and the pallet P are in contact with each other, the marks 210, 212, 214 and 216 of the position identifying device 202 are detected by the cameras 150, 152. In addition, although the marks are detected by the cameras 150, 152 in the present embodiment, the method for detecting the marks is not limited thereto. For example, instead of the cameras, a laser sensor may detect the position of the object. Position information on the detected marks 210, 212, 214, and 216 is detected as information for identifying the position of the first pallet P. The movement control system 1 calculates the position of the pallet P and determines an access route, by analyzing the image information in which the marks 210, 212, 214, and 216 are captured.

In this manner, the position of the pallet P may be calculated by capturing the position identifying device 202 associated with the first pallet P by the camera disposed in the facility W. Further, by using the position identifying device 202, the position where the fork 24 is disposed when the pallet P is held can be detected with high accuracy. Thus, the position detection accuracy can be further improved. Note that the switch 220 may not be required.

Figure 17:
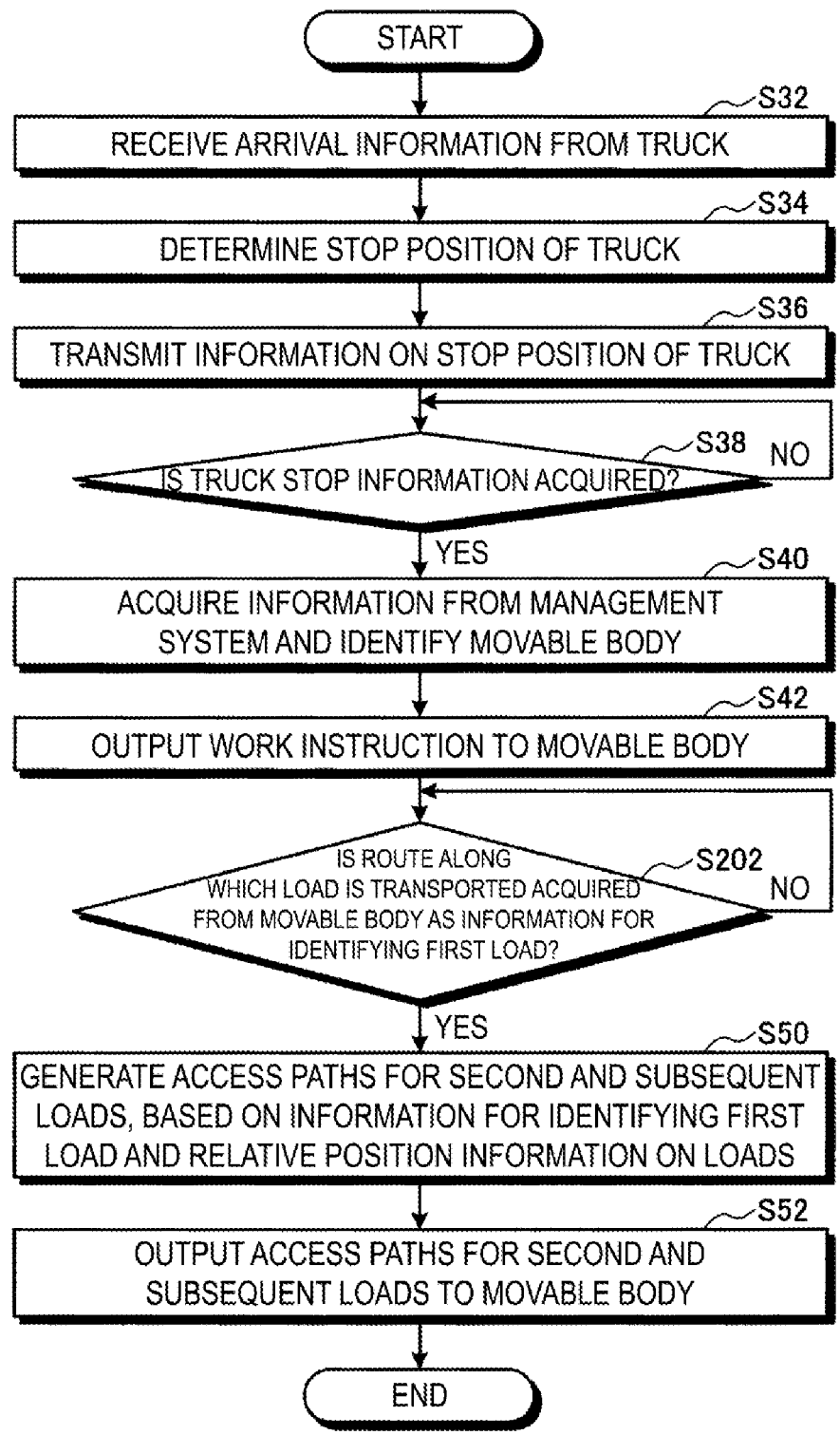
FIG. 17 is a flowchart illustrating another example of the processing performed by the computation device.
Figure 18:
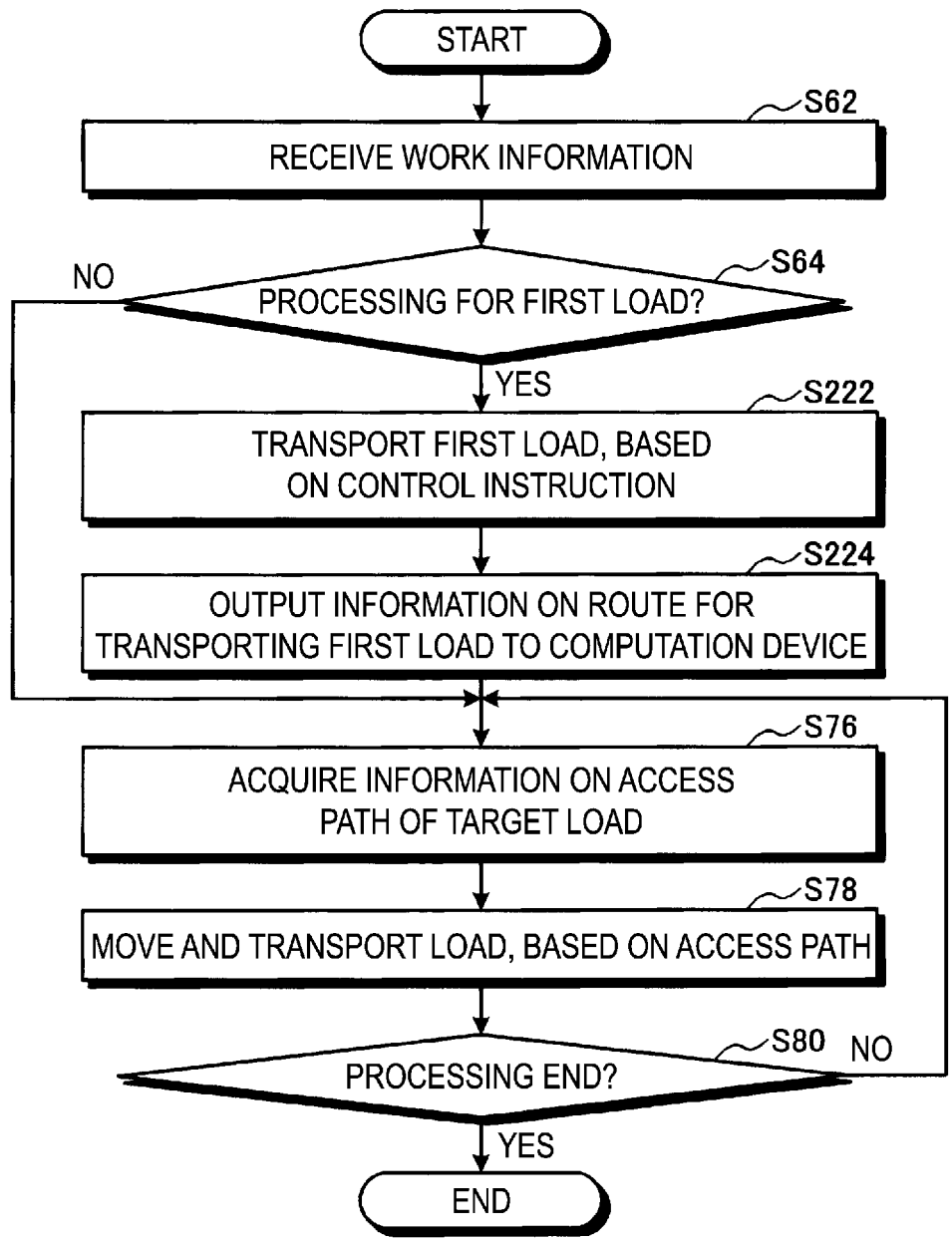
FIG. 18 is a flowchart illustrating another example of the processing performed by the movable body.

In the movement control system 1 of the above embodiment, the position identifying device is detected, and, based on the result, the information for identifying the position of the first pallet is acquired, but the method of acquiring the information for identifying the location of the first pallet is not limited thereto. In the movement control system 1, the position of the first pallet may be detected based on information when the worker controls the operation of the movable body 10 to actually move the pallet. FIG. 17 is a flowchart illustrating another example of the processing performed by the computation device. FIG. 18 is a flowchart illustrating another example of the processing performed by the movable body.

The computation device 14 acquires arrival information from the truck (step S32). The computation device 14 determines a truck stop position (step S34), and outputs information on the truck stop position to the truck (step S36). The computation device 14 determines whether the truck stop information has been acquired (step S38). The computation device 14 determines whether information indicating that the truck to which the stop position information has been provided has stopped in the designated position has been received. When the computation device 14 determines that the truck stop information has not been acquired (No in step S38), the processing returns to step S38. In other words, the computation device 14 repeats the processing in step S38 until the truck stop information is acquired.

When the computation device 14 determines that the truck stop information has been acquired (Yes in step S38), the computation device 14 acquires information from the management system and identifies a movable body (step S40). That is, a movable body carrying out the pallet P from the truck V is identified. The computation device 14 outputs a work instruction to the identified movable body (step S42). The work instruction includes information on the route for moving the movable body 10 that carries out the first pallet to the vicinity of the first pallet P in the area Ar, and an instruction to execute processing of detecting the position of the first pallet P.

Next, the computation device 14 determines whether information on the transport route has been acquired from the movable body as information for identifying the position of the first load (pallet) (step S202). When the computation device 14 determines that the information for identifying the position of the first load (pallet) has not been acquired (No in step S202), the processing returns to step S202. In other words, the computation device 14 repeats the processing in step S202 until the information for identifying the position of the first load (pallet) is acquired.

When it is determined that the information for identifying the position of the first load (pallet) has been acquired (Yes in step S202), the computation device 14 generates access paths for the second and subsequent loads, based on the information for identifying the first load (pallet) and relative position information on the loads (pallets) (step S50).

That is, the position of each pallet mounted on the truck V is calculated, based on the position information on the first pallet and the relative position information on each pallet mounted on the truck V, and the route along which the movable body 10 makes access is generated, based on the position of each pallet. The relative position information on each pallet can be acquired based on the information on the loading platform of the truck, the position of each pallet mounted, and the like, included in the information transmitted from the truck. Upon generating the access paths, the computation device 14 outputs the access paths for the second and subsequent loads (pallets) to the movable body (step S52). When the plurality of pallets P mounted on the one truck V are transported by the plurality of movable bodies 10, the computation device 14 outputs respective access paths to the movable bodies 10.

Next, an operation of the movable body 10 will be described. FIG. 18 is a flowchart illustrating another example of the processing performed by the movable body. The movable body 10 acquires work information transmitted from the computation device 14 (step S62). When acquiring the work information, the movable body 10 determines whether the information is for processing for the first load (pallet) (step S64). The movable body 10 may execute the processing in steps S64 to S80 by executing the processing included in the work information without executing the determination processing. In other words, the movable body 10 may perform the processing based on the work information and perform each of the processing operations in FIG. 9.

When the movable body 10 determines that the information is not for the processing for the first load (pallet) (No in step S64), the processing proceeds to step S76. When determining that the information is for the processing for the first load (pallet) (Yes in step S64), the movable body 10 transports the first load (pallet) based on a control instruction (step S222). Here, the control instruction is input by the worker. As the input method by the worker, an input may be performed by a remote operation using a remote controller, or may be performed by operating the operation unit of the movable body 10. When the remote controller is used, the remote operation may be performed while the site is checked using the monitor, or may be performed while the movable body 10 and the pallet are viewed on-site. Next, the movable body 10 outputs, to the computation device, the information on the route for transporting the first load (pallet) as information on an identification position which is information for identifying the position of each pallet (step S224).

After executing the processing in step S224 or when making a determination of No in step S64, the movable body 10 acquires information on the access path for the target load (step S76). That is, the movable body 10 acquires information on the access paths for transporting the second and subsequent pallets and the route for moving to the target pallet. The movable body 10 moves based on the acquired access path, and transports each load (pallet) (step S78).

The movable body 10 determines whether the processing has ended, that is, whether the transport of the pallets has ended (step S80). When the movable body 10 determines that the processing has not ended (No in step S80), the processing returns to step S76 and the processing of transporting another pallet P is performed. When the movable body 10 determines that the processing has ended (Yes in step S80), the present processing ends.

The movement control system 1 may perform the transport of the first pallet by the worker's operation, identify the position of the first pallet, based on the information on the operated route, and calculate the access routes for the second and subsequent pallets. Thus, the worker transports only the first pallet, and it is possible to automatically detect the access routes for the remaining pallets. Further, in the case of the present embodiment, the movable body 10 operated by the worker may be provided with a driver seat.

In addition, it is preferable that the movement control system 1 be provided with a monitoring device, and that the movable bodies 10 other than the target movable body 10 be not approach the worker when the worker is performing auxiliary operations for identifying the position of the first pallet. This increases the safety of a work operation.

Other Examples of System

Further, in the present embodiment, the management system 12 determines work details indicating information on each pallet P, and the computation device 14 identifies the target movable body 10, and acquires the route R.

However, the processing details of the management system 12 and the computation device 14 are not limited thereto. For example, the management system 12 may perform at least some of the processing of the computation device 14 instead, or the computation device 14 may perform at least some of the processing of the management system 12 instead. Further, the management system 12 and the computation device 14 may be configured as one device (computer).

The embodiment of the disclosure is described above, but the embodiment is not limited by the embodiment above. Further, the constituent elements of the above-described embodiment include elements that are able to be easily conceived by a person skilled in the art, and elements that are substantially the same, that is, elements of an equivalent scope. Furthermore, the constituent elements described above can be appropriately combined. Further, it is possible to make various omissions, substitutions, and changes to the constituent elements within a range not departing from the scope of the above-described embodiment.

For example, in the present embodiment, the target area is a vehicle such as a truck, but it is only required that the target objects (loads) be regularly arranged (aligned) within a predetermined range. The present disclosure can also be applied in cases where the target object is disposed in the area where a partition is provided.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A control device for outputting information to a movable body configured to move automatically, the control device comprising:
    a processor; and
    a non-transitory computer-readable medium having stored thereon executable instructions that, when executed by the processor, cause the control device to function as:
    a route acquisition unit configured to acquire routes of the movable body for moving target objects to or from a target position at which the target objects are to be picked up or dropped, the target position being in a stop position of a transport vehicle which deviates from a presumed installation position;
    a reference position/posture acquisition unit configured to acquire information on a position at which the movable body picks up or drops a first target object of the target objects at the target position; and
    an information output unit configured to output information acquired by the route acquisition unit to the movable body,
    wherein the route acquisition unit is configured to:
    acquire the routes of the movable body for moving second and subsequent target objects of the target objects, based on the information acquired by the reference position/posture acquisition unit;
    acquire information on positions and postures of the second and subsequent target objects; and
    modify the routes of the movable body for moving the second and subsequent target objects, based on the information on the positions and the postures of the second and subsequent target objects.

2. The control device according to claim 1, wherein the reference position/posture acquisition unit is configured to acquire position information on the first target object, calculated based on a marker associated with the target position.

3. The control device according to claim 2, wherein the marker is installed at or adjacent to the target position.

4. The control device according to claim 2, wherein:
    each of the target objects includes an opening portion into which a support is to be inserted during transport by the movable body;
    the marker is attached to a tip configured to be inserted into the opening portion; and
    the reference position/posture acquisition unit is configured to acquire the position information in a state in which the tip is inserted into the first target object.

5. The control device according to claim 1, wherein the reference position/posture acquisition unit is configured to acquire information on a route along which the movable body moves for transporting the first target object.

6. The control device according to claim 5, wherein the information on the route along which the movable body moves for transporting the first target object is information on a route along which the movable body is moved by a remote operation.

7. The control device according to claim 5, wherein the information on the route along which the movable body moves for transporting the first target object is information on a route along which the movable body is moved by an operation in a state where a worker rides on the movable body.

8. The control device according to claim 1, wherein the target position is a loading platform of the transport vehicle which is a truck.

9. A movement control system comprising:
    the control device according to claim 1; and
    the movable body.

10. A control method of a movable body configured to transport target objects to or from a target position, the control method comprising:
    acquiring information on a position for picking up or dropping a first target object of the target objects at the target position, the target position being in a stop position of a transport vehicle which deviates from a presumed installation position;
    acquiring routes of the movable body for moving second and subsequent target objects of the target objects, based on the information on the position for picking up or dropping the first target object;
    acquiring information on positions and postures of the second and subsequent target objects;
    modifying the routes of the movable body for moving the second and subsequent target objects, based on the information on the positions and the postures of the second and subsequent target objects; and
    outputting the routes of the movable body.

11. A non-transitory computer-readable medium having stored thereon executable instructions for causing a processor to execute a control method of a movable body configured to transport target objects to or from a target position, the executable instructions comprising:
- acquiring information on a position for picking up or dropping a first target object of the target objects at the target position, the target position being in a stop position of a transport vehicle which deviates from a presumed installation position;
- acquiring routes of the movable body for moving second and subsequent target objects of the target objects, based on the information on the position for picking up or dropping the first target object;
- acquiring information on positions and postures of the second and subsequent target objects;
- modifying the routes of the movable body for moving the second and subsequent target objects, based on the information on the positions and the postures of the second and subsequent target objects; and
- outputting the routes of the movable body.

* * * * *